E. L. CRANE.
DIRIGIBLE HEADLIGHT FOR AUTOMOBILES.
APPLICATION FILED DEC. 10, 1917.
1,357,957.
Patented Nov. 9, 1920.
2 SHEETS—SHEET 1.
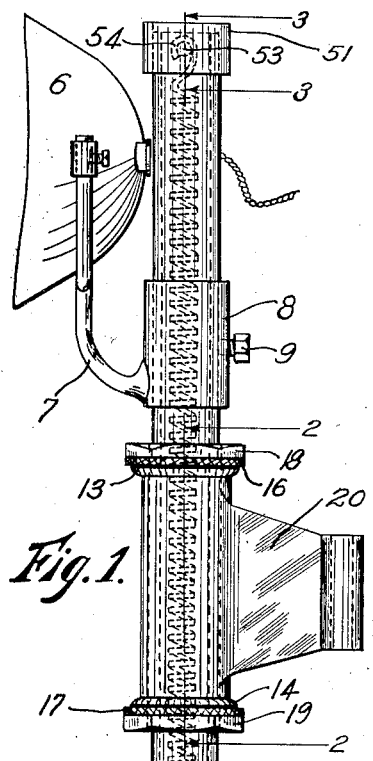
Fig. 1.
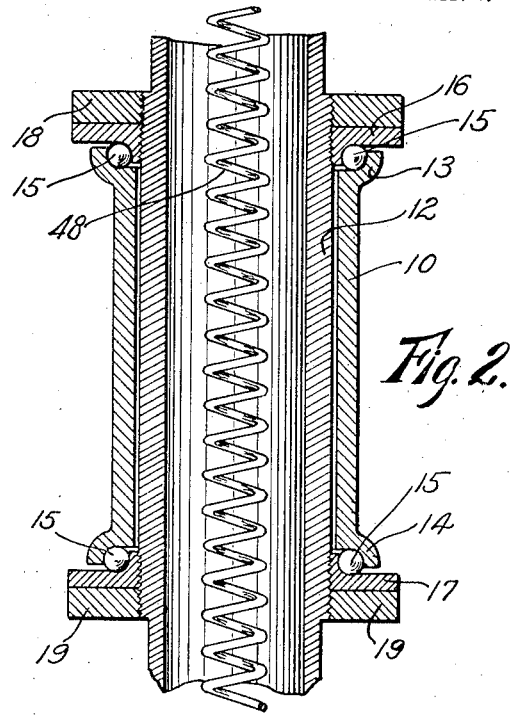
Fig. 2.
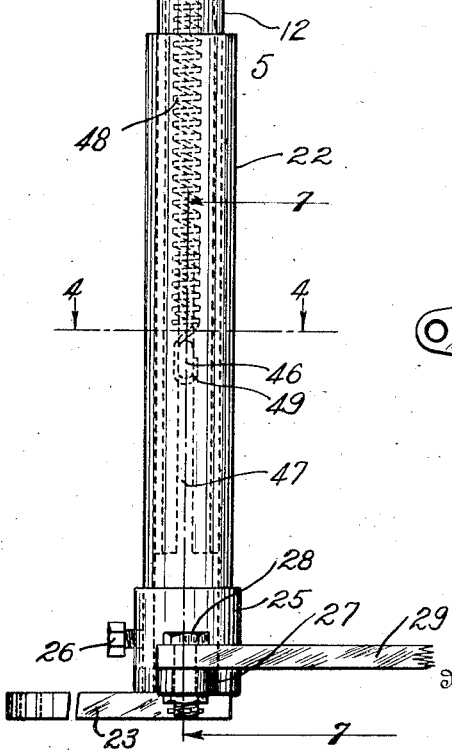
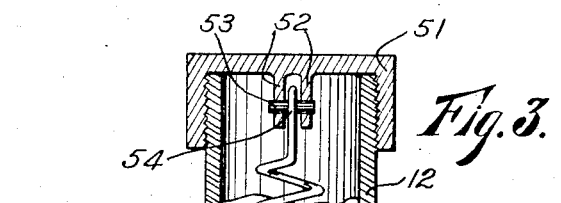
Fig. 3.
Fig. 4.
Inventor
Edward L. Crane.
By
Attorney E. L. CRANE.
DIRIGIBLE HEADLIGHT FOR AUTOMOBILES.
APPLICATION FILED DEC. 10, 1917.

1,357,957.

Patented Nov. 9, 1920.

Inventor
Edward L. Crane.
By
Attorney

UNITED STATES PATENT OFFICE.

EDWARD L. CRANE, OF DENVER, COLORADO.

DIRIGIBLE HEADLIGHT FOR AUTOMOBILES.

1,357,957.  Specification of Letters Patent.  Patented Nov. 9, 1920.

Application filed December 10, 1917. Serial No. 206,369.

*To all whom it may concern:*

Be it known that I, EDWARD L. CRANE, a citizen of the United States, residing at the city and county of Denver and State of Colorado, have invented certain new and useful Improvements in Dirigible Headlights for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in dirigible head lights for automobiles, my object being to provide a construction which shall operate in conjunction with the steering mechanism, whereby the lamps in front of the automobile are made to turn simultaneously with the turning of the front wheels of the machine, and whereby the light is kept on the track in front of the machine on turns or curves as well as where the road is straight. My further object is to provide a simple, inexpensive and thoroughly efficient construction of this character.

Having briefly outlined the improvement as well as the function it is intended to subserve, I will proceed to describe the same in detail, reference being made to the accompanying drawing in which is illustrated an embodiment thereof. In this drawing:

Figure 1 is a side elevation of my improved device.

Fig. 2 is a fragmentary longitudinal section of the construction shown on a much larger scale.

Fig. 3 is a fragmentary sectional view in detail.

Fig. 4 is a cross section taken on the line 4—4 Fig. 1 looking downwardly.

The same reference characters indicate the same parts in all the views.

Figure 5:
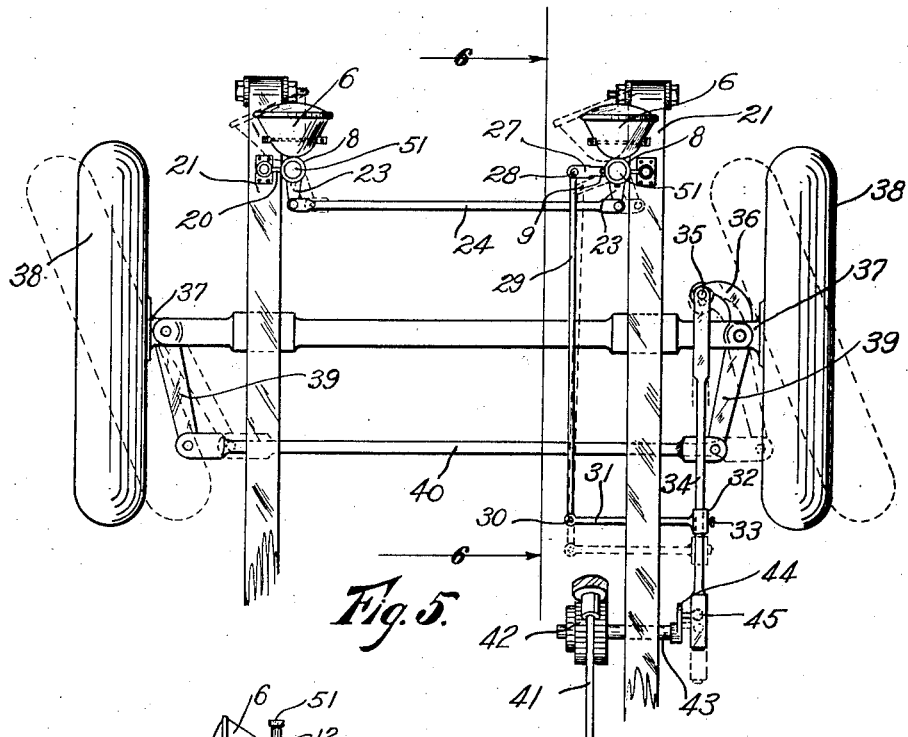
Fig. 5 is a top plan view of the running gear of the forward part of an automobile showing my improvement applied, the parts being shown on a much smaller scale than in the previous views.
Figure 6:
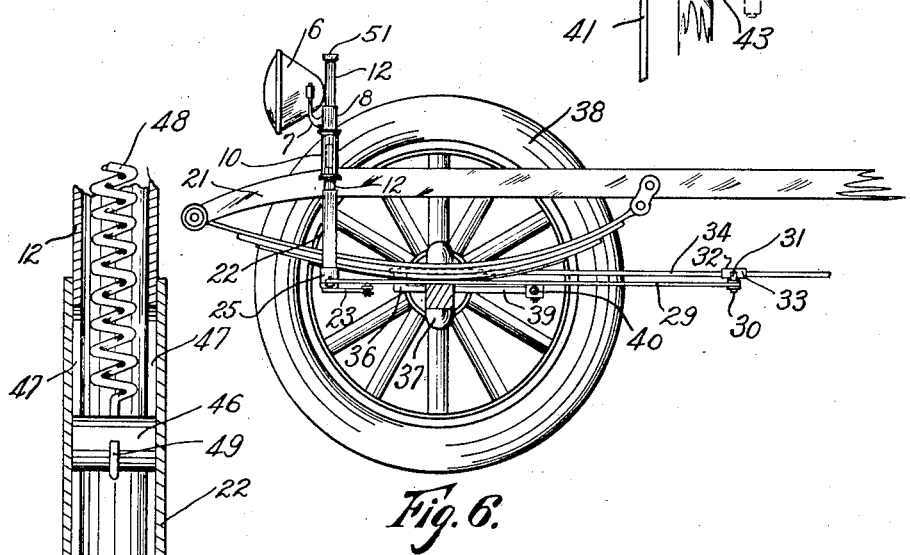
Fig. 6 is a section taken on the line 6—6, Fig. 5 looking toward the right.
Figure 7:
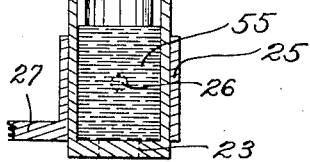
Fig. 7 is a sectional detail view taken on the line 7—7, Fig. 4, looking toward the left.

Let the numeral 5 designate a post considered in its entirety. There are two of these posts and each forms the support for a lamp 6, the lamp-supporting arm 7 being mounted on a sleeve 8 vertically adjustable on the post by means of a set screw 9. Each of these posts is provided with a sleeve 10 which surrounds the body member 12 of the post, its opposite extremities being formed into cups 13 and 14 which engage bearing balls 15, these balls also in turn engaging cup members 16 and 17 which are threaded on the member 12 of the post and held in place by lock nuts 18 and 19. By virtue of this construction the body of the post upon which the lamp is mounted is adapted to turn freely in the sleeve 10. This sleeve is provided with a laterally disposed arm 20 which is secured to one of the frame bars 21 of the machine, whereby the sleeve 10 is rigid with the bar.

The member 12 of the post is hollow and telescopes in a second member 22. To the lower extremity of this member 22 of each post is secured an arm 23, and these arms are connected by a transverse rod 24. To the lower extremity of the member 22 of one post is secured a sleeve 25 by means of a set screw 26, whereby the sleeve is rotatably adjustable on the post member. This sleeve is provided with an arm 27 to the outer extremity of which is pivotally connected as shown at 28, a rod 29 whose rear extremity is connected, as shown at 30, with an arm 31 whose opposite extremity is provided with a sleeve 32 which is adjustably secured by means of a set screw 33 with a rod 34. The forward extremity of the rod 34 is pivotally connected as shown at 35 with a crank arm 36 which is rigidly secured to one of the stub axles 37 of the automobile wheels 38. Each stub axle is further provided with a crank arm 39, these two crank arms being connected by a rod 40, whereby as the rod 34 is moved forward or back, wheels 38 are turned for steering purposes. This movement of the rod 34 is accomplished through the medium of the steering post 41 which has a worm gear connection 42 with a rock shaft 43, provided with a crank arm 44, which is operatively connected as shown at 45 with the rear extremity of the rod 34. By virtue of this construction, when the rod 34 is moved for steering purposes a corresponding movement is imparted to each of the lamps 6 of the machine.

The post member 22 is provided with a rigid web or key 46 which extends transversely therethrough, the member 12 of the post being slotted as shown at 47, to receive said web, the latter forming a guide to the part 12 of the post during the vibration of the machine. The connection, however, between the parts 12 and 22 is such, that when the part 22 is turned for the purpose of shifting the lamps to correspond with the turning movement of the front wheels of the automobile, the part 12 of the post is also turned. Hence, the parts 12 and 22 of the post are connected to rotate in unison though they are allowed independent vertical movement by virtue of their telescopic connection. Furthermore, the part 22 of the post, together with its connections, is yieldingly suspended from the part 12 so that the body or chassis of the machine may vibrate without interfering with the members 22 of the post and its connections. This yielding connection between the parts 22 and 12 of the post consists of a spiral spring 48 whose lower extremity is provided with a hook 49 which engages the web 46 from below, while the upper extremity of the spring is connected with a screw cap 51 applied to the top of the body member 12 of the post. As shown in the drawing, the screw cap 51 has a pair of spaced lugs 52 carrying a pin 53, a hook 54 formed on the upper extremity of the spring, being connected with this pin and occupying a position between the lugs 52. Hence, the body member 12 of the post which carries the lamp as heretofore explained, is allowed to vibrate freely with the body or spring supported chassis of the machine, while the part 22 of the post and its connections, through the medium of which the lamps are turned simultaneously with the turning of the front wheels, remain in their normal position.

The lower extremity of the post member 22 is closed and a quantity of oil 55 is placed therein which provides the necessary lubrication between the two telescoping members of the post.

From the foregoing description, the use and operation of my improved dirigible head light construction will be readily understood. When the person in charge of the machine operates the steering post 41 and shifts the front wheels 38 from the full line to the dotted line position (see Fig. 5), the lamps will be correspondingly shifted to occupy approximately the dotted line position in the same view by virtue of the construction and arrangement of parts heretofore described.

Having thus described my invention, what I claim is:

1. In dirigible headlights for automobiles and other vehicles, the combination with the steering mechanism, of a post composed of upper and lower telescoping members connected to turn in unison, a lamp mounted on the upper member, a support mounted on the body of the machine and in which the upper member is journaled, a tension spring positively connected to each of the upper and lower members to permit independent vibration, and an operative connection between the lower member of the post and the steering mechanism of the vehicle.

2. In apparatus of the class described, the combination with the steering mechanism of the vehicle, of a post composed of upper and lower telescoping members connected to turn in unison, both of said members being tubular, a lamp mounted on the upper member of the post, a support mounted on the body of the machine and in which the upper member is journaled, a spring within the inner member and positively connected to both the upper and lower members to permit independent vibration, and an operative connection between the lower member and the steering mechanism.

3. In dirigible headlights for automobiles and other vehicles, the combination with the steering mechanism, of a post composed of upper and lower telescoping members connected to turn in unison, a lamp mounted on the upper member, a connection between the upper member of the post and the body of the vehicle to permit the post to rotate, a tension spring positively connected to each of the upper and lower members to permit independent vibration, and an operative connection between the lower member of the post and the steering mechanism.

4. In dirigible headlights for automobiles and other vehicles, the combination with the steering mechanism of the vehicle, of two posts, each composed of upper and lower telescoping members, all of said telescoping members being tubular, a lamp mounted on the upper member of each post, one member being vertically slotted and the other member having a part entering the slot to cause the two members to turn in unison, an operative connection between the upper member of each post and the body of the vehicle to permit the said member to turn for headlight steering purposes, a spring within each inner member and positively connecting the upper and lower members of each post to permit independent vibration, and an operative connection between the two lower members and the steering mechanism.

In testimony whereof I affix my signature.

EDWARD L. CRANE.